United States Patent
Mallick et al.

(10) Patent No.: US 12,045,480 B2
(45) Date of Patent: Jul. 23, 2024

(54) NON-DISRUPTIVE SWITCHING OF MULTI-PATHING SOFTWARE

(71) Applicant: Dell Products L.P., Round Rock, TX (US)

(72) Inventors: Sanjib Mallick, Bangalore (IN); Kurumurthy Gokam, Bangalore (IN); Mohammad Salim Akhtar, Jamshedpur (IN)

(73) Assignee: Dell Products L.P., Round Rock, TX (US)

(*) Notice: Subject to any disclaimer, the term of this patent is extended or adjusted under 35 U.S.C. 154(b) by 307 days.

(21) Appl. No.: 17/550,497

(22) Filed: Dec. 14, 2021

(65) Prior Publication Data
US 2023/0185467 A1    Jun. 15, 2023

(51) Int. Cl.
*G06F 3/06* (2006.01)
(52) U.S. Cl.
CPC .......... *G06F 3/0635* (2013.01); *G06F 3/0604* (2013.01); *G06F 3/0679* (2013.01)
(58) Field of Classification Search
None
See application file for complete search history.

(56) References Cited

U.S. PATENT DOCUMENTS 6,567,397 B1   5/2003  Campana et al.
6,687,746 B1   2/2004  Shuster et al.
(Continued)

FOREIGN PATENT DOCUMENTS

CN    103677927 B   2/2017
EP     1117028 A2   7/2001
(Continued)

OTHER PUBLICATIONS

Fuzi, Nathan, Implementing Linux native multipathing or DM-MPIO together with EMC PowerPath, flashdba Database Performance in the Cloud, Mar. 30, 2015. https://flashdba.com/2015/03/30/implementing-linux-native-multipathing-or-dm-mpio-together-with-emc-powerpath/ (Year: 2015).*

(Continued)

*Primary Examiner* — Khoa D Doan
*Assistant Examiner* — Edmund H Kwong
(74) *Attorney, Agent, or Firm* — Ryan, Mason & Lewis, LLP

(57) ABSTRACT

An apparatus comprises a processing device that includes a processor coupled to a memory. The processing device is configured to identify a source multi-path device in first multi-pathing software, to create a target multi-path device in second multi-pathing software different than the first multi-pathing software, to copy a set of paths of the source multi-path device to the target multi-path device, to add to the set of paths of the source multi-path device a new path to the target multi-path device, and to remove paths other than the new path from the source multi-path device. Such an arrangement illustratively provides non-disruptive switching of path selection functionality of a host device from the source multi-path device of the first multi-pathing software to the target multi-path device of the second multi-pathing software. The source and target multi-path devices illustratively utilize different storage access protocols, such as respective SCSI and NVMe access protocols.

20 Claims, 7 Drawing Sheets

(56) References Cited

U.S. PATENT DOCUMENTS

| | | | |
|---|---|---|---|
| 6,697,875 B1 | 2/2004 | Wilson | |
| 7,003,527 B1 | 2/2006 | Lavallee et al. | |
| 7,275,103 B1 | 9/2007 | Thrasher et al. | |
| 7,397,788 B2 | 7/2008 | Mies et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,819,307 B1 | 8/2014 | Raizen et al. | |
| 8,825,919 B1 | 9/2014 | Lim et al. | |
| 8,832,334 B2 | 9/2014 | Okita | |
| 8,874,746 B1 | 10/2014 | Gonzalez | |
| 8,959,249 B1 | 2/2015 | Love | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,712,613 B2 | 7/2017 | Balasubramanian et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,523,513 B2 | 12/2019 | Bennett et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 10,911,402 B2 | 2/2021 | Pusalkar et al. | |
| 11,050,660 B2 | 6/2021 | Rao et al. | |
| 11,093,155 B2 | 8/2021 | Anchi et al. | |
| 11,106,381 B2 | 8/2021 | Rao et al. | |
| 2001/0054093 A1 | 12/2001 | Iwatani | |
| 2002/0023151 A1 | 2/2002 | Iwatani | |
| 2002/0103923 A1 | 8/2002 | Cherian et al. | |
| 2003/0179227 A1 | 9/2003 | Ahmad et al. | |
| 2003/0195956 A1 | 10/2003 | Bramhall et al. | |
| 2003/0208581 A1 | 11/2003 | Behren et al. | |
| 2004/0010563 A1 | 1/2004 | Forte et al. | |
| 2004/0057389 A1 | 3/2004 | Klotz et al. | |
| 2004/0073648 A1 | 4/2004 | Tanino et al. | |
| 2004/0081186 A1 | 4/2004 | Warren et al. | |
| 2006/0026346 A1 | 2/2006 | Kadoiri et al. | |
| 2006/0036736 A1 | 2/2006 | Kitamura et al. | |
| 2006/0106819 A1 | 5/2006 | Dhanadevan et al. | |
| 2006/0129876 A1 | 6/2006 | Uemura | |
| 2006/0277383 A1 | 12/2006 | Hayden et al. | |
| 2007/0174849 A1* | 7/2007 | Cheung | G06F 9/4411 |
| | | | 719/321 |
| 2007/0239989 A1 | 10/2007 | Barnett et al. | |
| 2007/0242617 A1 | 10/2007 | Ichimura | |
| 2007/0294563 A1 | 12/2007 | Bose | |
| 2008/0043973 A1 | 2/2008 | Lai et al. | |
| 2008/0147893 A1 | 6/2008 | Marripudi et al. | |
| 2008/0201458 A1 | 8/2008 | Salli | |
| 2008/0244174 A1 | 10/2008 | Abouelwafa et al. | |
| 2008/0301332 A1 | 12/2008 | Butler et al. | |
| 2009/0006780 A1 | 1/2009 | Sato et al. | |
| 2009/0259749 A1 | 10/2009 | Barrett et al. | |
| 2009/0282135 A1 | 11/2009 | Ravindran et al. | |
| 2010/0131950 A1 | 5/2010 | Yamada et al. | |
| 2010/0313063 A1 | 12/2010 | Venkataraja et al. | |
| 2011/0161520 A1 | 6/2011 | Horiuchi et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0163374 A1 | 6/2012 | Shah et al. | |
| 2012/0246345 A1 | 9/2012 | Contreras et al. | |
| 2013/0019001 A1 | 1/2013 | Winokur | |
| 2013/0046892 A1 | 2/2013 | Otani | |
| 2013/0117766 A1 | 5/2013 | Bax et al. | |
| 2013/0121161 A1 | 5/2013 | Szabo et al. | |
| 2013/0339551 A1 | 12/2013 | Flanagan et al. | |
| 2014/0105068 A1 | 4/2014 | Xu | |
| 2015/0089015 A1 | 3/2015 | Rosset et al. | |
| 2015/0222705 A1 | 8/2015 | Stephens | |
| 2015/0242134 A1 | 8/2015 | Takada et al. | |
| 2015/0319245 A1 | 11/2015 | Nishihara et al. | |
| 2016/0050277 A1 | 2/2016 | Kirk et al. | |
| 2016/0092136 A1 | 3/2016 | Balakrishnan et al. | |
| 2016/0117113 A1 | 4/2016 | Li et al. | |
| 2016/0246749 A1 | 8/2016 | Kobashi | |
| 2016/0335003 A1 | 11/2016 | Ahmed et al. | |
| 2016/0380804 A1 | 12/2016 | Amano | |
| 2017/0134220 A1 | 5/2017 | Chen et al. | |
| 2017/0220406 A1 | 8/2017 | Parnell et al. | |
| 2017/0235507 A1 | 8/2017 | Sinha et al. | |
| 2018/0004425 A1 | 1/2018 | Suzuki | |
| 2018/0026863 A1 | 1/2018 | Hughes et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0020603 A1 | 1/2019 | Subramani et al. | |
| 2019/0095299 A1 | 3/2019 | Liu et al. | |
| 2019/0108888 A1 | 4/2019 | Sarkar et al. | |
| 2019/0319846 A1 | 10/2019 | Dhanadevan et al. | |
| 2019/0334987 A1 | 10/2019 | Mallick et al. | |
| 2020/0021653 A1 | 1/2020 | Rao et al. | |
| 2020/0021654 A1 | 1/2020 | Rao et al. | |
| 2020/0050388 A1* | 2/2020 | Takata | H04L 67/1097 |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0133508 A1* | 4/2020 | Feng | G06F 3/0647 |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0225863 A1* | 7/2020 | Veluswamy | G06F 3/0647 |
| 2020/0241890 A1* | 7/2020 | Mallick | G06F 9/44505 |
| 2020/0314218 A1* | 10/2020 | Kumar | G06F 13/4221 |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |
| 2021/0019054 A1 | 1/2021 | Anchi et al. | |
| 2021/0026551 A1 | 1/2021 | Tidke et al. | |
| 2021/0026650 A1 | 1/2021 | Rao et al. | |
| 2021/0157502 A1 | 5/2021 | Rao et al. | |
| 2021/0181965 A1 | 6/2021 | Anchi et al. | |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |

(56) References Cited

FOREIGN PATENT DOCUMENTS

| WO | PCT/US2019/053473 | 12/2019 |
|----|-------------------|---------|
| WO | PCT/US2019/067144 | 5/2020  |

OTHER PUBLICATIONS

Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
VMware, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: ISCSI Implementation for Dell EMC Storage Arrays Running PowerMaxOS," Technical White Paper, Sep. 2019, 35 pages.
Wikipedia, "Fibre Channel Zoning," https://en.wikipedia.org/wiki/Fibre_Channel_zoning, Aug. 19, 2020, 2 pages.
E. Smith, "Introducing Target Driven Zoning (TDZ)" https://brasstacksblog.typepad.com/brass-tacks/2012/01/introducing-target-driven-zoning-tdz.html, Jan. 16, 2012, 9 pages.
Broadcom, "Fabric Operating System 9.0," Technical Brief, Fabric Notifications, FOS-90-Fabric-Notifications-OT101, Nov. 4, 2020, 12 pages.
Brocade, "Brocade Guide to Understanding Zoning," vol. 1, 2002, 27 pages.
A. Wasson, "General Rules and Limits for Auto-Provisioning on Symmetric VMAX," http://community.emc.com/docs/DOC-16553, May 8, 2012, 2 pages.
E. Goggin et al., "Linux Multipathing," Proceedings of the Linux Symposium, vol. 1, 2005, 21 pages.
K. Ueda et al., "Request-based Device-mapper Multipath and Dynamic Load Balancing," Proceedings of the Linux Symposium, vol. 2, 2007, 9 pages.
U.S. Appl. No. 17/151,302 filed in the name of Vinay G. Rao et al. filed Jan. 18, 2021, and entitled "Multi-Path Layer Configured for Detection and Mitigation of Slow Drain Issues in a Storage Area Network."
U.S. Appl. No. 17/501,433 filed in the name of Gopinath Marappan et al. filed Oct. 14, 2021, and entitled "Non-Disruptive Migration of Logical Storage Devices in a Linux Native Multi-Pathing Environment."

\* cited by examiner

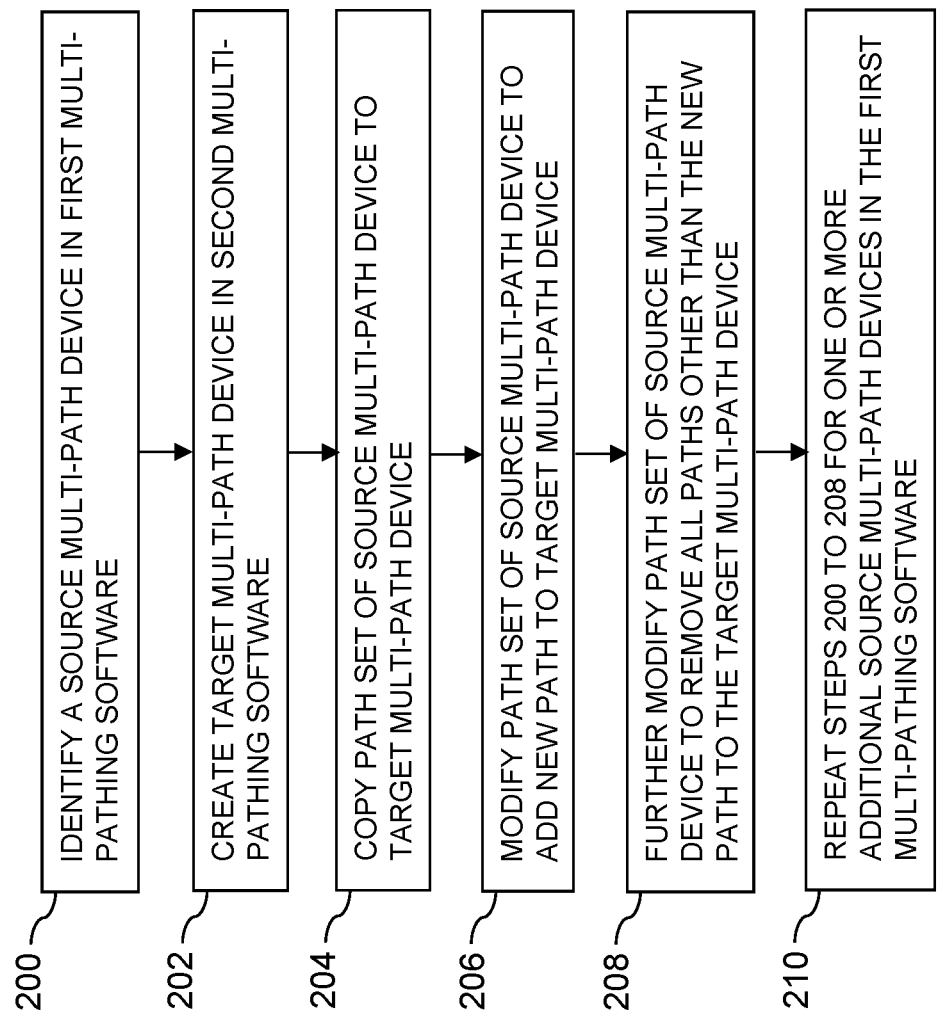

NON-DISRUPTIVE SWITCHING OF MULTI-PATHING SOFTWARE

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. Various types of storage access protocols can be used by host devices to access logical units (LUNs) or other logical storage devices of the storage system, including by way of example Small Computer System Interface (SCSI) access protocols and Non-Volatile Memory Express (NVMe) access protocols. Such access protocols are typically utilized in conjunction with multi-pathing software on the host devices, where the multi-pathing software is associated with a particular multi-pathing environment, such as a Linux native multi-pathing environment. However, switching of multi-pathing software of one or more host devices from a Linux native multi-pathing environment to a different multi-pathing environment can present problems under conventional practice. For example, it can be difficult to perform such switching of multi-pathing software in a manner that avoids significant application downtime. Accordingly, a need exists for improved techniques that can avoid such drawbacks of conventional approaches.

SUMMARY

Illustrative embodiments provide techniques for non-disruptive switching of multi-pathing software associated with different multi-pathing environments, such as a first multi-pathing environment utilizing a SCSI access protocol and a second multi-pathing environment utilizing an NVMe access protocol. The first multi-pathing environment in some embodiments comprises a Linux native multi-pathing environment, although it is to be appreciated that references herein to particular multi-pathing environments and associated multi-pathing software are presented by way of illustration and not limitation. The disclosed techniques can advantageously switch from a first type of multi-pathing software that utilizes a multi-path device in a Linux native multi-pathing environment to a second type of multi-pathing software, different than the first type, utilizing a different multi-path device in another multi-pathing environment, without any application downtime or reconfiguration of any kind. Such arrangements can be used, for example, to modify a storage access protocol used to access one or more LUNs or other logical storage devices from SCSI to NVMe, or from NVMe to SCSI.

It is to be appreciated that the term "non-disruptive switching of multi-pathing software" as used herein is intended to be broadly construed, so as to encompass, for example, switching of storage access protocol for one or more LUNs or other logical storage devices by modifying at least a portion of the multi-pathing software that is used to implement one or more corresponding multi-path devices in an information processing system. Such switching of multi-pathing software in some embodiments therefore illustratively involves altering or otherwise modifying the configuration of one or more multi-path devices, such as, for example, combining a new multi-path device implemented using one type of multi-pathing software with an existing multi-path device implemented using another type of multi-pathing software. Numerous other multi-path device modifications or other multi-pathing software switching arrangements are possible using the techniques disclosed herein.

In some embodiments, the disclosed multi-pathing software switching techniques are implemented at least in part in a multi-path layer of at least one host device configured to communicate over a storage area network (SAN) with one or more storage arrays or other types of storage systems. As indicated previously, one or more such embodiments advantageously provide highly efficient non-disruptive switching of multi-pathing software while also avoiding application downtime.

The multi-path layer illustratively comprises at least one multi-path input-output (MPIO) driver configured to process IO operations of at least one host device that communicates with one or more storage arrays or other types of storage systems over designated paths through a SAN or other type of network.

Other types of host drivers or other host device components can be used in place of or in addition to one or more MPIO drivers in implementing functionality for non-disruptive switching of multi-pathing software as disclosed herein.

In an illustrative embodiment, an apparatus comprises at least one processing device that includes a processor and a memory, with the processor being coupled to the memory. The at least one processing device in this embodiment is configured to identify a source multi-path device in first multi-pathing software, to create a target multi-path device in second multi-pathing software different than the first multi-pathing software, to copy a set of paths of the source multi-path device to the target multi-path device, to add to the set of paths of the source multi-path device a new path to the target multi-path device, and to remove paths other than the new path from the source multi-path device.

Such an arrangement illustratively provides non-disruptive switching of path selection functionality of a host device from the source multi-path device of the first multi-pathing software to the target multi-path device of the second multi-pathing software.

In some embodiments, the source multi-path device operates in accordance with a first storage access protocol for accessing one or more logical storage devices of a storage system, and the target multi-path device operates in accordance with a second storage access protocol for accessing one or more logical storage devices of the storage system, with the second storage access protocol being different than the first storage access protocol. Accordingly, the source and target multi-path devices illustratively utilize different storage access protocols, such as respective SCSI and NVMe access protocols.

The at least one processing device illustratively comprises at least a portion of the host device. Other embodiments can include multiple host devices, with each such host device implementing similar functionality.

In some embodiments, the at least one processing device comprises at least one MPIO driver implemented in the host device and configured to control the delivery of the IO operations to one or more logical storage devices of a storage system over selected paths through a network. The MPIO driver of the host device in some embodiments comprises a device mapper MPIO driver operating in a Linux native multi-pathing environment.

In some embodiments, a given IO operation generated by an application executing on a host device is directed by the application to the source multi-path device, and directed by the source multi-path device to the target multi-path device, with the target multi-path device selecting a particular one of the paths in the copied set of paths for delivery of the IO operation to a logical storage device of a storage system.

These and other illustrative embodiments include, without limitation, apparatus, systems, methods and computer program products comprising processor-readable storage media.

BRIEF DESCRIPTION OF THE DRAWINGS

FIG. 2 is a flow diagram of an example process for non-disruptive switching of multi-pathing software in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
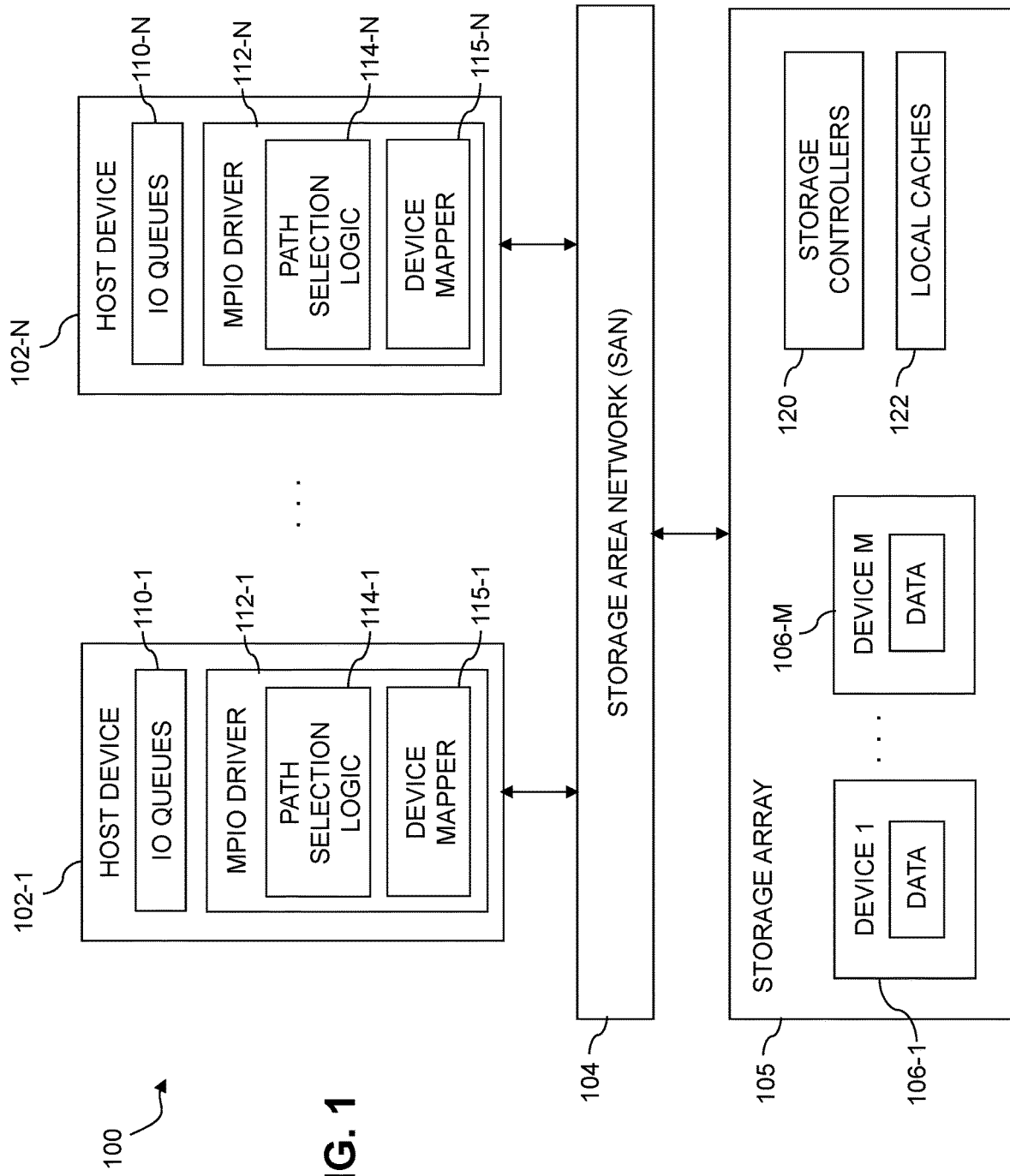
FIG. 1 is a block diagram of an information processing system configured with functionality for non-disruptive switching of multi-pathing software in an illustrative embodiment.

FIG. 1 shows an information processing system 100 configured in accordance with an illustrative embodiment. The information processing system 100 comprises a plurality of host devices 102-1, . . . 102-N. The host devices 102 communicate over a storage area network (SAN) 104 with at least one storage array 105. The SAN 104 in some embodiments illustratively comprises one or more switch fabrics. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for non-disruptive switching of multi-pathing software as disclosed herein. Such functionality is provided at least in part using respective instances of device mapper 115-1, . . . 115-N implemented within the MPIO drivers 112. An MPIO driver that includes or is otherwise associated with at least one such device mapper is also referred to herein as a device mapper MPIO driver.

The MPIO drivers 112 may comprise, for example, otherwise conventional MPIO drivers, such as Linux native multi-path drivers, suitably modified in the manner disclosed herein to provide functionality for non-disruptive switching of multi-pathing software. Other types of MPIO drivers may be suitably modified to incorporate functionality for non-disruptive switching of multi-pathing software as disclosed herein.

The host devices 102 can include additional or alternative components. For example, in some embodiments, the host devices 102 comprise respective local caches, implemented using respective memories of those host devices. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate, potentially leading to substantial mismatches in initiator and target negotiated rates for the same switch, set of switches or switch fabric of the SAN 104.

The term "negotiated rate" therefore illustratively comprises a rate negotiated between an initiator or a target and a switch of a switch fabric of SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates, such as 1G, 2G, 4G, 8G, 16G, 32G, 64G and 128G, where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec. Other negotiated rates referred to herein are denoted in terms of Gigabytes per second (GB/sec).

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

In some embodiments, the system 100 is configured in accordance with a layered system architecture that illustratively includes a host device processor layer, an MPIO layer, an HBA layer, a switch fabric layer, a storage array port layer and a storage array processor layer. The host device processor layer, the MPIO layer and the HBA layer are associated with at least a subset of the host devices 102, the switch fabric layer is associated with the SAN 104, and the storage array port layer and storage array processor layer are associated with the storage array 105. The storage array processors of the storage array processor layer may be viewed as examples of respective storage controllers 120 of the storage array 105.

Application processes of the host device processor layer generate IO operations that are processed by the MPIO layer for delivery to the storage array 105 over the SAN 104, which illustratively comprises one or more switch fabrics of the switch fabric layer. Paths are determined by instances of the path selection logic 114 for sending such IO operations to the storage array 105. More particularly, the path selection logic 114 determines appropriate paths over which to send particular IO operations to particular logical storage devices of the storage array 105. Non-disruptive switching of multi-pathing software is illustratively provided utilizing instances of device mapper 115 in the MPIO layer.

The MPIO layer is an example of what is also referred to herein as a multi-path layer, and illustratively comprises one or more MPIO drivers 112 implemented in respective host devices 102. Each such MPIO driver illustratively comprises respective instances of path selection logic 114 and device mapper 115 configured as previously described. Additional or alternative layers and logic arrangements can be used in other embodiments.

As noted above, path selection logic 114 is configured to select different paths for sending IO operations from a given host device to storage array 105. These paths may include, for example, a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are mentioned by way of illustrative example only, and in many practical implementations there will typically be a much larger number of paths between the host devices 102 and the storage array 105, depending upon the specific system configuration and its deployed numbers of HBAs, switch fabrics and storage array ports. For example, each host device in the FIG. 1 embodiment can illustratively have a set of k paths to shared storage array 105, or alternatively different ones of the host devices 102 can have different numbers and types of paths to the storage array 105.

Some implementations of the system 100 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 100 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical storage device of the storage array 105. The corresponding logical storage device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. Host multi-pathing software can be configured to facilitate non-disruptive switching of multi-pathing software as disclosed herein. For example, multi-pathing software residing on one or more of the host devices 102 (e.g., a server such as an ESXi server or an AIX server) is utilized in illustrative embodiments to support non-disruptive switching of multi-pathing software.

In the FIG. 1 embodiment, the storage array 105 comprises a plurality of storage controllers 120 and a plurality of local caches 122. For example, in some embodiments, each of the storage controllers 120 has a different local cache or a different allocated portion of a global cache associated therewith, each illustratively a "local cache" of its corresponding storage controller, as the term "local cache" is broadly used herein, although numerous alternative arrangements are possible. The storage controllers 120 can be implemented as respective storage processors, directors or other storage system components configured to control storage system operations relating to processing of IO operations.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection.

As indicated previously, problems can arise relating to switching of multi-pathing software in a Linux native multi-pathing environment. For example, it is difficult to perform such switching of multi-pathing software in a manner that avoids significant application downtime.

Some embodiments avoid these and other problems of conventional practice by providing techniques for non-disruptive switching of multi-pathing software, where such switching effectively modifies the storage access protocol of logical storage devices which are under the control of a source multi-path device of first multi-pathing software, illustratively in a Linux native multi-pathing environment.

For example, one or more embodiments involve non-disruptively inserting a target multi-path device, illustratively in a PowerPath® multi-pathing environment, as one of the paths of the source multi-path device in the Linux native multi-pathing environment, in conjunction with copying of the paths of the source multi-path device to the target multi-path device, and then removing all paths other than the path to the target multi-path device from the source multi-path device. Path selection and associated load balancing is then handled by the target multi-path device in the PowerPath® multi-pathing environment, with the target multi-path device having the same device mapping as the source multi-path device.

With this approach, an application can continue to use the source multi-path device without any downtime and without any need for reconfiguration, although the path selection functionality is now implemented by the target multi-path device in the PowerPath® multi-pathing environment. Similar non-disruptive switching arrangements can be provided using other multi-pathing software in other multi-pathing environments.

Multi-pathing software is typically configured to group multiple paths from a host device to a LUN into a single logical device known as a "multi-path device." The individual block devices associated with the paths are sometimes referred to as "native devices" and are more generally referred to herein as corresponding to respective LUNs or other logical storage devices. Applications use a multi-path device for IO operations so that the IO operations directed to one or more LUNs or other logical storage devices can be distributed by the multi-path device across all available paths to the one or more LUNs. Also, when one or more paths fail, the multi-path device will redirect the IO operations to other paths that remain functional.

As applications will usually continuously utilize the multi-path device for IO operations, it becomes a challenge to remove and replace a particular instance of multi-pathing software without disrupting IO operations and without any downtime. The multi-path device is an entity created by the multi-pathing software and hence the software cannot be replaced without first uninstalling the existing multi-pathing software.

A user might want to change the multi-pathing software for many reasons, such as better IO throughput and other features provided by other multi-pathing software. But the multi-path devices created by the existing multi-pathing software are tightly coupled to the existing multi-pathing software. Due to this tight coupling of multi-pathing software with multi-path devices, users under current practice are generally not able to change the multi-pathing software without application downtime. Absent use of the techniques disclosed herein, there is no adequate solution available to move from one multi-pathing software to another multi-pathing software without downtime and application reconfiguration.

Some embodiments disclosed herein are configured to non-disruptively switch multi-pathing software in a manner that reconfigures the storage access protocol of the logical storage devices from SCSI to NVMe or vice versa. Such embodiments can allow users who are utilizing Linux native multi-pathing software and the SCSI access protocol to easily and quickly adapt to a different multi-pathing software, such as PowerPath® multi-pathing software, which utilizes the NVMe access protocol. The disclosed techniques can be similarly applied to support transition between other storage access protocols and other types of multi-pathing software. For example, the disclosed techniques can be adapted for use with storage access protocol transitions such as FC to NVMe/TCP, FC to NVMeOF and iSCSI to NVMe/TCP. Also, the disclosed techniques can be automated for performing these and other transitions on multiple host devices substantially in parallel with one another.

As indicated previously, applications generate IO operations that are directed to devices. A native device, also sometimes referred to as a "basic device," generally represents a LUN, logical storage volume or other type of logical storage device that is a target of read IO and/or write IO of an application. These and additional or alternative devices are illustratively part of a given IO stack as that term is broadly used herein.

An example of a native device in the Linux OS is a device denoted /dev/sdX. Also, one or more special devices are formed on top of these native devices in a given IO stack. For example, in the case of multi-pathing functionality, Linux native multi-pathing software forms multi-path devices on top of native devices. If an application performs IO to a multi-path device, then it leverages the functionality of the multi-pathing environment. IO operations from the application are issued on the multi-path device, and the multi-path device sends the IO operations to the native devices.

It is assumed for some of the embodiments to be described that the MPIO drivers 112 of the host devices 102 comprise respective device mapper MPIO drivers operating in a Linux native multi-pathing environment. The MPIO drivers 112 illustratively comprise respective instances of device mapper 115. It is to be appreciated, however, that the disclosed techniques can be more generally applied to other environments, and accordingly should not be viewed as being limited to the Linux native multi-pathing environment.

In operation, the MPIO driver 112-1 is configured to control delivery of IO operations from its corresponding host device 102-1 to storage array 105 over selected ones of a plurality of paths through SAN 104, using its path selection logic 114-1, where the paths are associated with respective initiator-target pairs, the initiators being implemented on the host device 102-1 and the targets being implemented on the storage array 105.

The host device 102-1 provides at least a portion of an IO stack for processing of IO operations for delivery to one or more LUNs or other logical storage devices of the storage array 105 via the MPIO driver 112-1.

The IO stack illustratively comprises at least one multi-path device overlying one or more logical storage devices. In some embodiments, the MPIO driver 112-1 of the host device 102-1 comprises a device mapper MPIO driver operating in a Linux native multi-pathing environment, and the multi-path device illustratively comprises a request-based device in the Linux native multi-pathing environment.

Other types of MPIO drivers and associated multi-path devices can be used in other embodiments. A given MPIO driver such as MPIO driver 112-1 illustratively has a plurality of multi-path devices associated therewith, each corresponding to one or more logical storage devices in a given TO stack of the host device 102-1.

The host device 102-1 in illustrative embodiments is configured to identify a source multi-path device in first multi-pathing software, to create a target multi-path device in second multi-pathing software different than the first multi-pathing software, to copy a set of paths of the source multi-path device to the target multi-path device, to add to the set of paths of the source multi-path device a new path to the target multi-path device, and to remove paths other than the new path from the source multi-path device. The MPIO driver 112-1 illustratively utilizes the copied set of paths of the target multi-path device in selecting paths for delivery of TO operations to one or more corresponding logical storage devices.

Such an arrangement effectively switches the path selection functionality from the source multi-path device of the first multi-pathing software to the target multi-path device of the second multi-pathing software. This is an example of what is more generally referred to herein as "non-disruptive switching of multi-pathing software." The term as broadly used herein generally encompasses arrangements in which at least a portion of the multi-pathing functionality of a given host device is switched from being provided by first multi-pathing software to being provided by second multi-pathing software. As described in more detail elsewhere herein, such switching can be used to modify the storage access protocol through with the host device 102-1 communicates with one or more logical storage devices. The "switching" generally involves modifying at least a portion of a multi-pathing software configuration within the host device 102-1, illustratively by altering the multi-path device configuration through with the host device 102-1 accesses one or more logical storage devices.

As indicated previously, the first multi-pathing software illustratively comprises Linux native multi-pathing software of a Linux native multi-pathing environment, and the second multi-pathing software comprises a different type of multi-pathing software of a different multi-pathing environment, such as PowerPath® multi-pathing software.

The source and target multi-path devices are illustratively part of the above-noted TO stack for processing of TO operations in the host device 102-1 for delivery to one or more logical storage devices of the storage array 105 over selected ones of the paths in the copied set of paths. The target multi-path device is arranged below the source multi-path device in the IO stack, illustratively between the source multi-path device and one or more LUNs or other logical storage devices.

Also as mentioned above, the source multi-path device illustratively operates in accordance with a first storage access protocol for accessing one or more logical storage devices of the storage array 105 and the target multi-path device operates in accordance with a second storage access protocol for accessing one or more logical storage devices of the storage array 105, with the second storage access protocol being different than the first storage access protocol. The first and second storage access protocols illustratively comprise a SCSI access protocol and an NVMe access protocol, respectively.

In some embodiments, a given IO operation generated by an application executing on the host device 102-1 is directed by the application to the source multi-path device, and directed by the source multi-path device to the target multi-path device, with the target multi-path device selecting a particular one of the paths in the copied set of paths for delivery of the IO operation to a logical storage device of the storage array 105.

Accordingly, illustrative embodiments herein advantageously provide non-disruptive switching of path selection functionality of the host device 102-1 from the source multi-path device of the first multi-pathing software to the target multi-path device of the second multi-pathing software.

In some embodiments, copying a set of paths of the source multi-path device to the target multi-path device comprises copying at least portions of a storage access protocol personality of the source multi-path device to the target multi-path device. It is to be appreciated that terms such as "copying a set of paths" as used herein are intended to be broadly construed, so as to encompass, for example, copying path-characterizing information and/or other types of information from one or more path data structures or other types of data structures associated with or otherwise accessible to the source multi-path device.

Additionally or alternatively, adding to the set of paths of the source multi-path device a new path to the target multi-path device illustratively comprises triggering a path add notification for the source multi-path device, suspending the source multi-path device, modifying a path data structure of the source multi-path device to add the new path to the target multi-path device, and resuming the source multi-path device.

Similarly, removing paths other than the new path from the source multi-path device illustratively comprises suspending the source multi-path device, modifying a path data structure of the source multi-path device to remove all paths other than the new path to the target multi-path device, and resuming the source multi-path device.

Multi-path devices of the type described above are illustratively utilized to implement non-disruptive switching of multi-pathing software for logical storage devices accessible to the host device 102-1 via its MPIO driver 112-1.

At least a portion of such multi-pathing software switching is carried out by the device mapper 115-1 of the MPIO driver 112-1, in cooperation with the path selection logic 114-1. As indicated above, the MPIO driver 112-1 in the present embodiment is assumed to comprise a device mapper MPIO driver operating in a Linux native multi-pathing environment, although other MPIO drivers or host device components can be used.

The host device 102-1 is an example of what is more generally referred to herein as "at least one processing device" comprising a processor and a memory, with the processor being coupled to the memory. References herein to "at least one processing device" may instead comprise a portion of the host device 102-1, or at least a portion of multiple host devices 102, with each such host device implementing similar functionality. Other types of arrangements of one or more processing devices can be used to implement functionality for non-disruptive switching of multi-pathing software as disclosed herein. For example, some embodiments may utilize an MPIO management station or other arrangement of one or more external servers to facilitate non-disruptive switching of multi-pathing software by the host devices 102.

As indicated previously, the paths over which IO operations are delivered from the host device 102-1 to the storage array 105 under the control of the MPIO driver 112-1 are assumed to be associated with respective initiator-target pairs, with the initiators of the initiator-target pairs illustratively comprising respective HBAs of the host device 102-1 and the targets of the initiator-target pairs illustratively comprising respective storage array ports of the storage array 105. Other types of paths involving other types of initiators and targets can be used in other embodiments. Terms such as "initiator," "target" and "initiator-target pair" as used herein are therefore intended to be broadly construed.

Although described in the context of some embodiments as being performed by the MPIO driver 112-1 utilizing its path selection logic 114-1 and device mapper 115-1, one or more of the above-described operations in other embodiments can be performed elsewhere within the host device 102-1. Also, other ones of the MPIO drivers 112 and their respective other host devices 102 can be similarly configured.

An example of a process including operations of the type outlined above will be described below in conjunction with the flow diagram of FIG. 2. These and other operations referred to herein as being performed by one or more host devices operating in conjunction with one or more storage arrays of a storage system can in other embodiments involve additional or alternative system components, possibly including one or more external servers.

As noted above, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system involving virtual machines (VMs), where multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of virtual machines of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Aspects of non-disruptive switching of multi-pathing software as disclosed herein are illustratively performed utilizing instances of device mapper 115 in respective ones of the MPIO drivers 112 of the multi-path layer, possibly operating in conjunction with their corresponding instances of path selection logic 114. However, it is to be appreciated that additional system components can participate in the disclosed functionality for non-disruptive switching of multi-pathing software in illustrative embodiments. The term "non-disruptive switching" as used herein is intended to be broadly construed, so as to encompass a wide variety of additional or alternative arrangements for modifying multi-pathing software utilized to access one or more LUNs or other logical storage devices.

These and other illustrative embodiments disclosed herein provide functionality for non-disruptive switching of multi-pathing software, with at least portions of that functionality being implemented using one or more MPIO drivers of a multi-path layer of at least one host device. The MPIO drivers illustratively comprise Linux native multi-path drivers suitably modified to implement the techniques disclosed herein. Other types of host multi-pathing software can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 to provide non-disruptive switching of multi-pathing software between host devices 102 and storage array 105.

Examples of algorithms performed by a given one of the host devices 102-1 utilizing its MPIO driver 112-1 and its corresponding instances of path selection logic 114-1 and device mapper 115-1 will now be described. In the following description, a host device is also referred to herein as simply a "host." Similarly, a storage array is also referred to herein as simply an "array."

Additional aspects of the Linux native multi-pathing environment in the context of the example algorithms illustratively include the following.

Terminology

DM Multipath ("dm-multipath"): Driver that provides native multi-pathing functionality in Linux.

DM Mirror ("dm-mirror"): Driver that provides mirroring functionality in Linux, also referred to as a "mirror device."

Device Mapper ("dm"): Framework provided by the Linux kernel for mapping physical block devices onto higher-level virtual block devices. Illustratively corresponds, for example, to device mapper 115-1 of MPIO driver 112-1.

DM Device ("dm device"): A virtual block device created by device mapper.

Block Layer: Part of Linux kernel which implements an interface that applications and file systems use to access various storage devices.

Block IO ("bio"): Smallest unit of IO in Linux block layer.

Request: A collection of bio that is coalesced to get better throughput from underlying layers.

Device Mapper Features

An example implementation of the device mapper 115-1 of the MPIO driver 112-1 in the Linux native multi-pathing environment illustratively has the following features:

1. For multi-pathing, dm-multipath along with device mapper creates a virtual block device (/dev/dm-<number>) for each LUN it manages. When an IO is sent to a dm-multipath device, internally it will be sent on any of the underlying native devices (e.g., /dev/sdX or/dev/nvmeXnY). By default, dm-multipath can accept "bio" or "request" as input from a layer above, but only dispatches "request" as output to the layer below, and so dm-multipath is generally considered a request-based device.

2. For mirroring, such as in the context of an LVM, dm-mirror along with device mapper also creates a virtual block device (/dev/dm-<number>). When an IO is sent to a dm-mirror device, internally it will be cloned to all the constituent underlying devices. The underlying devices can be other dm devices, native devices or even other types of block devices. The dm-mirror device can only accept "bio" from the layer above and dispatches "bio" to the layer below, and so dm-mirror is considered a bio-based device.

3. Device mapper allows stacking one dm device on top of another dm device as long as certain requirements are satisfied. One key requirement is that a bio-based dm device can be stacked on top of another bio-based or request-based device. But a request-based device can be stacked only on top of another request-based device.

4. Device mapper allows creation of new virtual devices on top of existing dm devices as long as the conditions in item 3 above are met.

In the following description of the example algorithms, the source multi-path device is illustratively implemented using Linux native multi-pathing software, and the target multi-path device is illustratively implemented using different multi-pathing software, such as PowerPath® multi-pathing software. It is further assumed that the two different types of multi-pathing software utilize different storage access protocols, illustratively respective SCSI and NVMe access protocols, although other storage access protocols could be used.

An example algorithm in an illustrative embodiment includes the following steps, although additional or alternative steps could be used in other embodiments:

1. Insert a target multi-path device using the NVMe access protocol as one of the paths of a source multi-path device using the SCSI access protocol.

2. Remove all existing SCSI protocol paths of the source multi-path device.

3. Keep the path to the target multi-path device as the only path of the source multi-path device.

4. The target multi-path device will then perform the multi-pathing functionality, including path selection, load balancing and failover.

5. The target multi-path device communicates with the underlying native device or devices using the NVMe access protocol, although the source multi-path device has no knowledge of this access protocol.

6. Any protocol-specific commands can be converted or otherwise handled by the target multi-path device. This illustratively involves using driver-specific IO control (IOCTL) based on intercepting specific commands.

Accordingly, illustrative embodiments herein allow a user to move an application that is using first multi-pathing software to second multi-pathing software of a different type (e.g., move from Linux native multi-pathing software to PowerPath multi-pathing software). It reuses the existing source multi-path devices that are created by the first multi-pathing software on the host device 102-1 to ensure that the application does not experience any down time or require any reconfiguration.

Assume that a first multi-pathing software is installed on host device 102-1 and a user wants to move to second multi-pathing software. In such a case, the following algorithm may be implemented in the host device 102-1:

1. Install the second multi-pathing software, such that both types of multi-pathing software are co-existing on the host device 102-1.

2. For each of a plurality of source multi-path devices associated with respective different LUNs or other logical storage devices:
  (a) Determine its world-wide identifier (WWID) and/or other unique ID (e.g., Network Addressing Authority (NAA) ID).
  (b) Create a corresponding target multi-path device in the second multi-pathing software.
  (c) Copy the storage access protocol personality of the source multi-path device to the target multi-path device, including path set information characterizing an existing path set of the source multi-path device.
  (d) Raise a path add notification to the existing multi-path device, to add a new path, from the source multi-path device to the target multi-path device, to the existing path set of the source multi-path device.
  (e) Suspend the source multi-path device.
  (f) Modify the existing path set of the source multi-path device to add the new path to the target multi-path device.
  (g) Resume the source multi-path device.
  (h) Reload the multi-path device mapping. At this point, the path set of the source multi-path device includes a path to the target multi-path device.
  (i) Suspend the source multi-path device again.
  (j) Modify the mapping in such a way that only the path to the target multi-path device will be present in the path set of the source multi-path device.
  (k) Resume the source multi-path device.
  (l) Reload the multi-path device mapping.

3. For the source multi-path device, path selection functionality including load balancing and failover will now be done in the target multi-path device. In this way, the application will continue to use the source multi-path device but all the multi-pathing functionality is done by the target multi-path device and its associated multi-pathing software.

4. In general, applications use the multi-path device created by multi-pathing software for IO operations. Multi-pathing software "steals" the IO entry points for a block device to receive the IO operations from the application. Any IO coming to the multi-path device is internally routed to the actual native path based on the multi-path algorithm.

5. Additional steps are followed on host reboot, as indicated below.

6. When the second multi-pathing software is starting during the system boot, it creates multi-path devices. While creating a given multi-path device it will check if this device is transitioned from the first multi-pathing software. This can be done by comparing the unique ID of the multi-path device with a list of transitioned multi-path devices maintained in a database or other persistent storage.

7. If a match is found in the above-noted list, perform the following steps:
   (a) The second multi-pathing software will create the multi-path device as usual.
   (b) Using a device name for the multi-path device, from the database or other persistent storage, create a soft link for this multi-path device in the specified directory that was used by the first multi-pathing software.

In this manner, the application does not require a reconfiguration to use the new multi-path devices created by the second multi-pathing software.

Accordingly, illustrative embodiments herein can be implemented not only without application downtime, but also without requiring any application reconfiguration.

Such arrangements provide a highly effective solution to migrate users from native multi-pathing software to other types of multi-pathing software (e.g., PowerPath®).

Additionally or alternatively, if the target multi-pathing software has "host copy" data migration, then similar techniques can be used to migrate a multi-path device that is currently under the control of the first multi-pathing software. The second multi-pathing software can do the data migration as well as bring the multi-path device under its control.

The above example algorithms provide efficient solutions for switching multi-pathing software in a Linux native multi-pathing environment.

It is to be appreciated that the particular ordering and configuration of the algorithm steps and other features described in conjunction with the illustrative embodiments herein is exemplary only. Additional or alternative steps, possibly with a different ordering and/or partial overlap between certain steps, can be used.

Also, embodiments are not limited to use with a Linux native multi-pathing environment and a PowerPath® multi-pathing environment, but are more generally applicable to other types of multi-pathing environments and associated storage access protocols.

Illustrative embodiments can be implemented, for example, in one or more MPIO drivers of one or more host devices, with such MPIO drivers collectively providing a multi-path layer of the host devices.

For example, some embodiments are implemented though modification of otherwise conventional multi-pathing software, such as Linux native multi-pathing software. Other embodiments can be implemented in other MPIO drivers from various multi-pathing software vendors.

Illustrative embodiments disclosed herein can provide non-disruptive switching of multi-pathing software for a wide variety of different types of host devices, such as host devices comprising ESXi servers or AIX servers.

At least portions of the above-described algorithms and other related techniques and functionality disclosed herein are illustratively implemented by a given MPIO driver on a corresponding host device, and similarly by other MPIO drivers on respective other host devices. Such MPIO drivers illustratively form a multi-path layer or MPIO layer comprising multi-pathing software of the host devices. Other types of multi-pathing software and host drivers can be used in other embodiments. Additionally or alternatively, other host device components can be used to implement at least portions of the disclosed functionality for non-disruptive switching of multi-pathing software.

Additional examples of arrangements for non-disruptive switching of multi-pathing software will be described elsewhere herein in conjunction with the embodiments of FIGS. 2 and 3. Other types of arrangements for non-disruptive switching of multi-pathing software can be used in other embodiments.

These and other functions related to non-disruptive switching of multi-pathing software that are referred to herein as being performed by or under the control of the MPIO drivers 112 through interaction with the storage array 105 can in some embodiments be performed at least in part outside of MPIO drivers 112 utilizing other system components.

The above-described functions associated with non-disruptive switching of multi-pathing software in the MPIO driver 112-1 in some embodiments are carried out at least in part under the control of its device mapper 115-1, illustratively operating in cooperation with path selection logic 114-1. For example, the device mapper 115-1 is illustratively configured to control performance of portions of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for non-disruptive switching of multi-pathing software.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known multi-pathing software functionality, such as Linux native multi-pathing functionality. Such conventional multi-pathing software functionality is suitably modified in illustrative embodiments disclosed herein to support non-disruptive switching of multi-pathing software.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted 10 operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as one or more of the host devices 102.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and device mapper 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 210, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

The steps of the FIG. 2 process are illustratively performed at least in part by or under the control of a multi-path layer comprising one or more MPIO drivers of respective host devices, cooperatively interacting with a storage array or other storage system, and possibly with some participation by one or more additional components such as an external server providing management functionality. Other arrangements of additional or alternative system components can be configured to perform at least portions of one or more of the steps of the FIG. 2 process in other embodiments.

The steps shown in FIG. 2 more specifically relate to processing performed by a given host device, also referred to herein as simply a "host," interacting with a storage array. It is assumed that similar processes are implemented for each of a plurality of additional hosts that interact with the storage array.

The FIG. 2 process generally provides an example algorithm implemented by a host device in providing non-disruptive switching of multi-pathing software used to implement path selection functionality for one or more logical storage devices. The host device illustratively implements at least a portion of an IO stack that includes at least one multi-path device, and may include one or more additional devices. One or more such devices of the IO stack are illustratively configured by an MPIO driver of the host, which is assumed to comprise a device mapper MPIO driver operating in a Linux native multi-pathing environment as described elsewhere herein. The source multi-path device of the IO stack illustratively comprises a request-based device in the Linux native multi-pathing environment. The example algorithm illustratively modifies the IO stack by inserting a target multi-path device between the source multi-path device and one or more corresponding logical storage devices. It is assumed in this embodiment that the host executes both first multi-pathing software and second multi-pathing software, and the example algorithm non-disruptively switches the path selection functionality for one or more logical storage devices from the first multi-pathing software to the second multi-pathing software.

In step 200, the host identifies a source multi-path device in first multi-pathing software, such as Linux native multi-pathing software.

In step 202, the host creates a target multi-path device in second multi-pathing software, such as PowerPath® multi-pathing software.

In step 204, the host copies a path set of the source multi-path device to the target multi-path device. In some embodiments, this involves copying at least portions of the "personality" of the source multi-path device to the target multi-path device, although other copying arrangements involving other types of path data structures can be used.

In step 206, the host modifies the path set of the source multi-path device to add a new path from the source multi-path device to the target multi-path device.

In step 208, the host further modifies the path set of the source multi-path device to remove all paths other than the new path from the source multi-path device to the target multi-path device.

In step 210, steps 200 through 208 are repeated by the host for one or more additional source multi-path devices in the first multi-pathing software. Each such multi-path device is assumed to be associated with a different one or more logical storage devices of the storage array 105.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for non-disruptive switching of multi-pathing software. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for non-disruptive switching of multi-pathing software within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Referring now to FIG. 3, modifications to an example IO stack in conjunction with non-disruptive switching of multi-path software will be described.

Figure 3A:
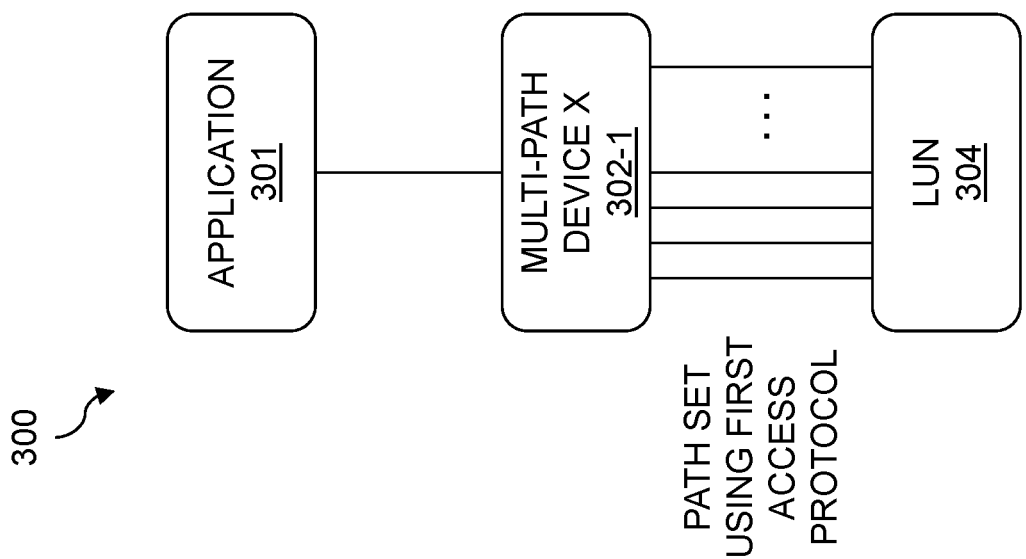
FIGS. 3A through 3E show an example of non-disruptive switching of multi-pathing software in another illustrative embodiment. These figures are collectively referred to herein as FIG. 3.

With reference initially to FIG. 3A, an IO stack 300 comprises an application 301, a multi-path device 302-1, and a LUN 304. The multi-path device 302-1 is an example of what is more generally referred to herein as a "source multi-path device" and is also denoted in the figure as multi-path device X. It is assumed that the multi-path device 302-1 is configured in accordance with first multi-pathing software, such as Linux native multi-pathing software. The application 301 illustratively accesses the LUN 304 via the multi-path device 302-1. More particularly, IOs generated by the application 301 are directed to the LUN 304 over selected ones of the paths to the LUN 304 that are supported by the multi-path device 302-1.

In some embodiments, the multi-path device 302-1 utilizes a particular storage access protocol to access the LUN 304, such as a SCSI access protocol. Additionally or alternatively, the multi-path device 302-1 may comprise a protocol-independent multi-path device. The paths between the multi-path device 302-1 and the LUN 304 in some embodiments comprise one or more protocol-dependent paths, although other arrangements of path sets can be used in other embodiments.

As shown in the figure, it is assumed without limitation that the paths between multi-path device 302-1 and LUN 304 utilize a first access protocol.

The IO stack 300 in the FIG. 3A arrangement generally illustrates the multi-pathing implementation prior to non-disruptive switching of multi-pathing software using the techniques disclosed herein. The non-disruptive switching is carried out in the manner illustrated in FIGS. 3B through 3E, as will now be described.

Figure 3B:
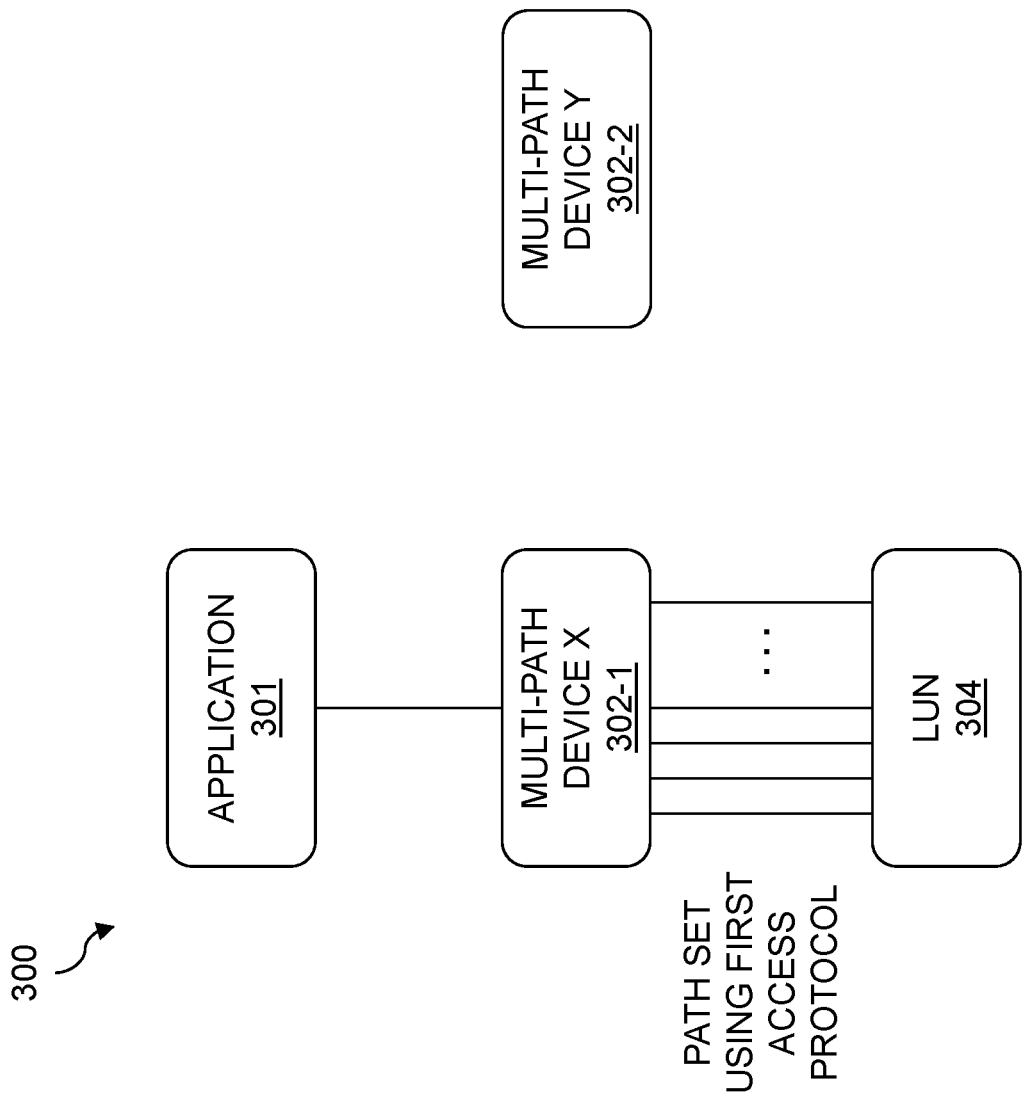

In FIG. 3B, a multi-path device 302-2 is created. The multi-path device 302-2 is an example of what is more generally referred to herein as a "target multi-path device" and is also denoted in the figure as multi-path device Y. It is assumed that the multi-path device 302-2 is configured in accordance with second multi-pathing software, such as PowerPath® multi-pathing software.

In some embodiments, the paths between the multi-path device 302-1 and the LUN 304 comprise paths that utilize an FC-based access protocol, while the paths between the multi-path device 302-2 and LUN 304 utilize a different type of access protocol, such as an NVMe access protocol. A wide variety of other types of storage access protocols can be used in other embodiments, and as indicated previously, non-disruptive switching of multi-pathing software as that term is generally used herein can comprise, for example, modification of multi-path device configuration to effective switch between storage access protocols for accessing one or more LUNs such as LUN 304.

At this point in the process, the application 301 continues to access the LUN 304 via the multi-path device 302-1. Accordingly, IOs generated by the application 301 at this point continue to be directed to the LUN 304 over selected ones of the paths to the LUN 304 that are supported by the multi-path device 302-1.

Figure 3C:
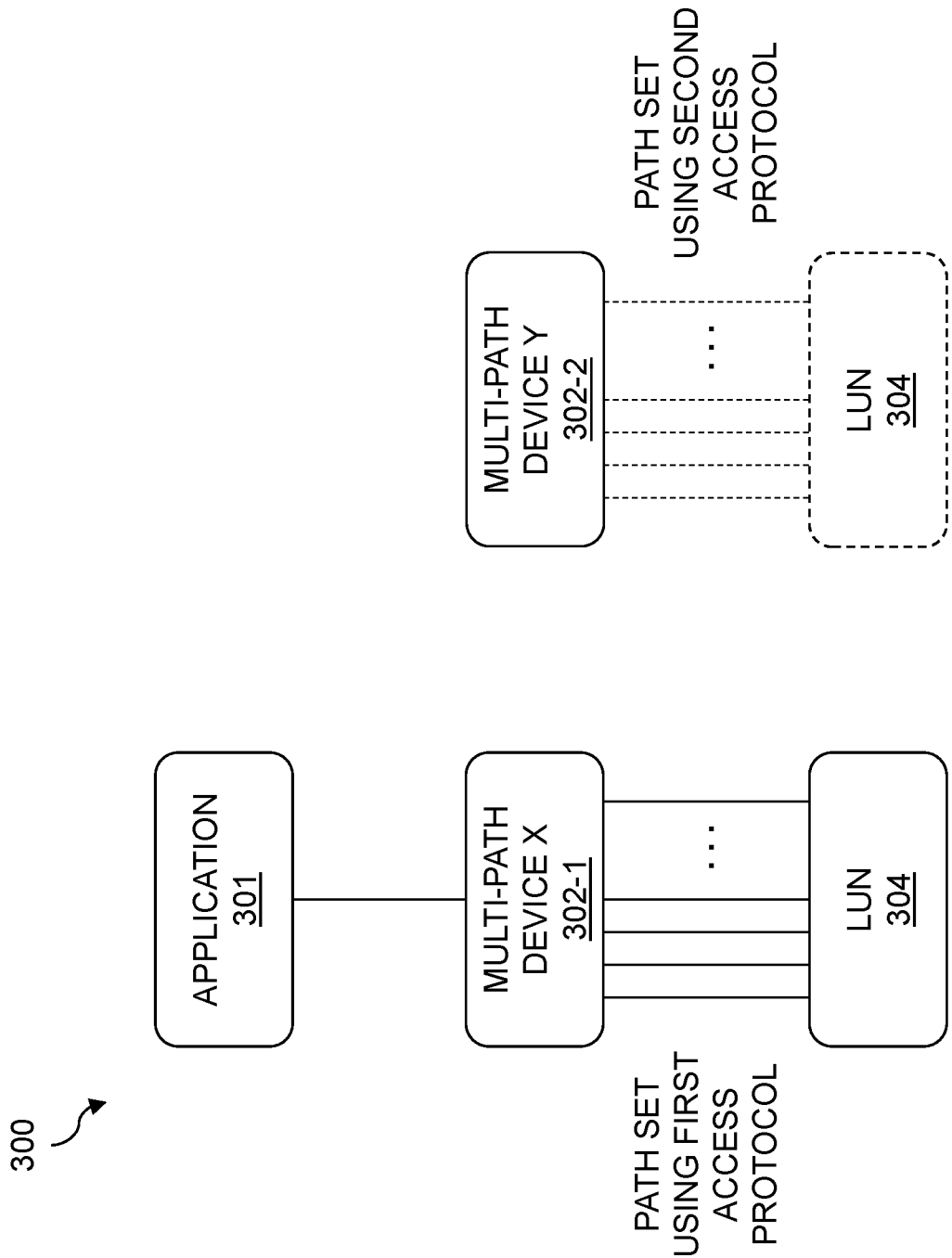

In FIG. 3C, a path set comprising multiple parallel paths between the multi-path device 302-1 and the LUN 304 is copied to the multi-path device 302-2 as illustrated. As a result, the multi-path device 302-2 now has the same set of paths to the LUN 304 as the multi-path device 302-1. However, it is assumed without limitation that the multi-path device 302-2 uses a second access protocol, different than the first access protocol. Accordingly, as shown in the figure, the paths between multi-path device 302-2 and LUN 304 illustratively utilize a second access protocol, different than the first access protocol.

Figure 3D:
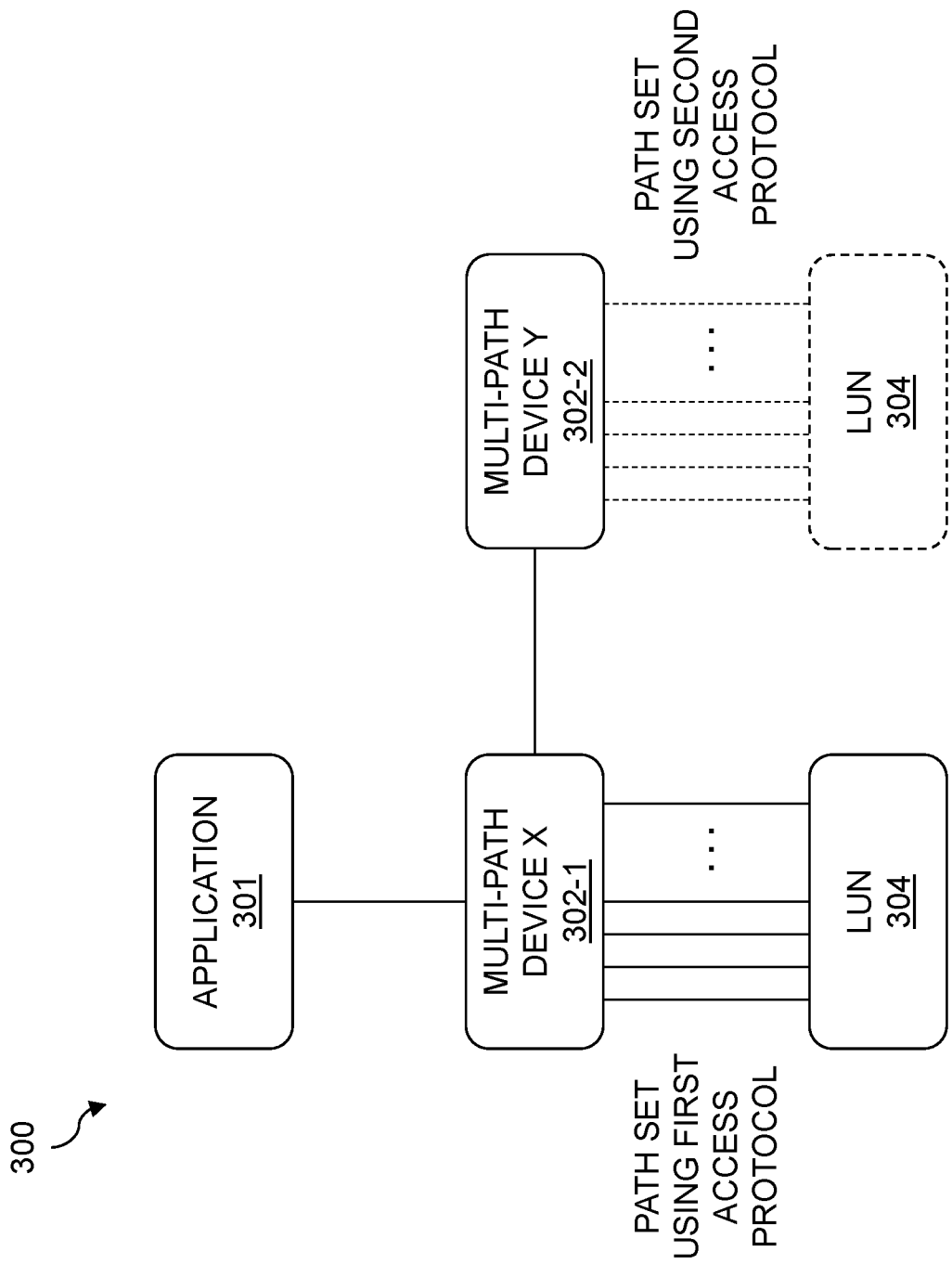

In FIG. 3D, a new path is added to the path set of the multi-path device 302-1, with the new path being a path from the multi-path device 302-1 to the multi-path device 302-2, as illustrated.

Figure 3E:
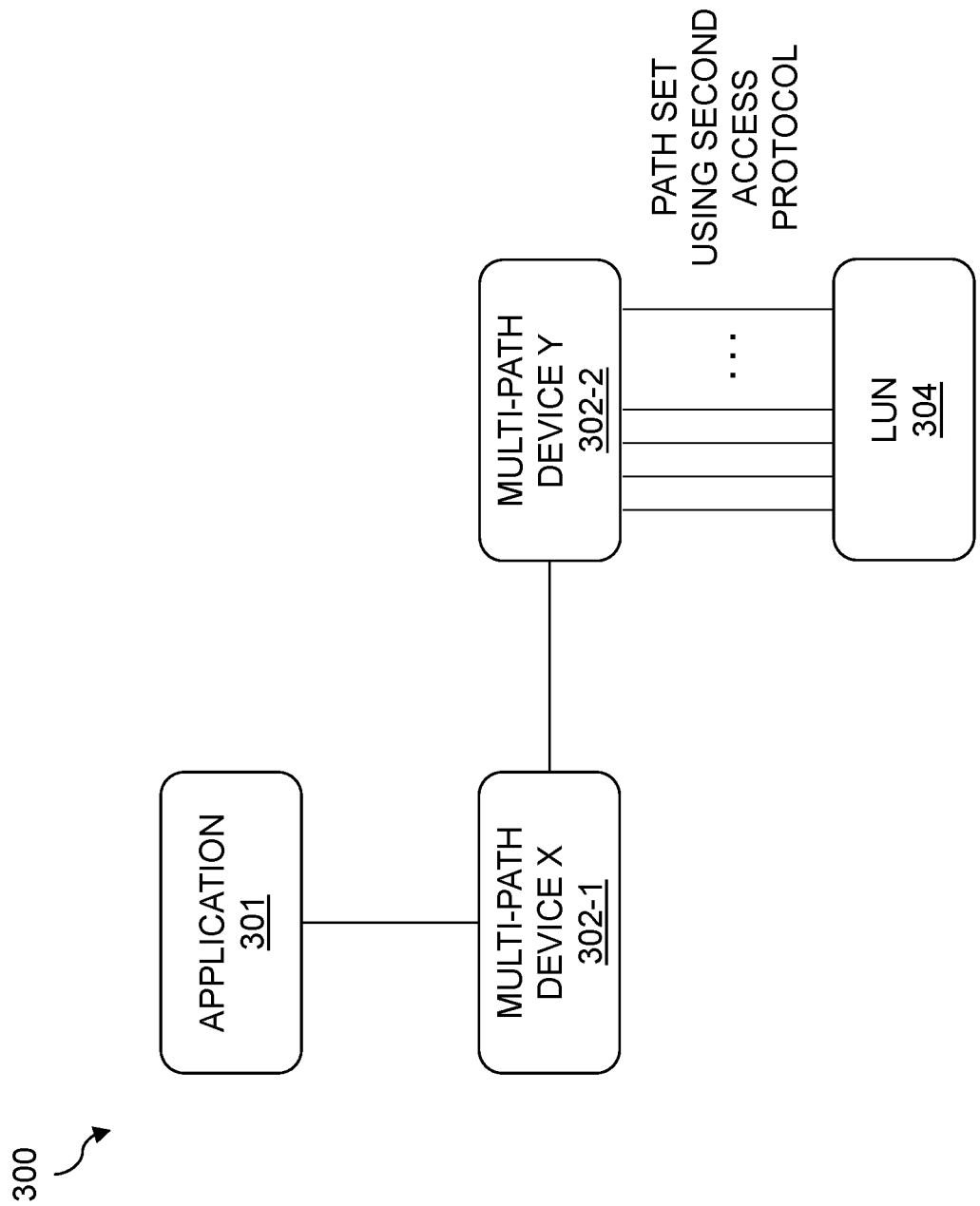

In FIG. 3E, all paths of the path set of the multi-path device 302-1, other than the new path from the multi-path device 302-1 to the multi-path device 302-2, are removed as illustrated. In accordance with this configuration, the application 301 can now access the LUN 304 via the multi-path device 302-2. Accordingly, IOs generated by the application 301 at this point in the process can be directed to the LUN 304 over selected ones of the paths to the LUN 304 that are supported by the multi-path device 302-2.

Assuming that the first and second multi-pathing software utilize respective different first and second storage access protocols, such as respective SCSI and NVMe protocols, the non-disruptive switching of multi-pathing software as illustrated in FIG. 3 effectively switches the LUN 304 from utilization of the SCSI access protocol to utilization of the NVMe access protocol, with no application downtime or reconfiguration. This is an example of "non-disruptive switching of multi-pathing software" as that term is broadly used herein.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for non-disruptive switching of multi-pathing software can be performed using different system components.

The particular arrangements described above for non-disruptive switching of multi-pathing software are therefore presented by way of illustrative example only. Numerous alternative arrangements of these and other features can be used in implementing the non-disruptive switching of multi-pathing software in other illustrative embodiments.

As indicated previously, the illustrative embodiments disclosed herein can provide a number of significant advantages relative to conventional arrangements.

For example, some embodiments are advantageously configured to provide highly efficient and effective non-disruptive switching of multi-pathing software in one or more host devices in a manner that avoids downtime for applications as well as any need to reconfigure the applications to utilize different multi-pathing software or storage access protocols.

Illustrative embodiments provide particularly effective techniques for switching of multi-pathing software in a Linux native multi-pathing environment, but are suitable for use in other types of environments.

Various aspects of functionality associated with non-disruptive switching of multi-pathing software as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system.

Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and device mapper 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, storage controllers, processors, memories, IO queues, MPIO drivers, initiators, targets, path selection logic, device mappers, and additional or alternative components. Also, the particular configurations of system and device elements and associated processing operations illustratively shown in the drawings can be varied in other embodiments. For example, a wide variety of different host device and storage system configurations and associated arrangements for non-disruptive switching of multi-pathing software can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to identify a source multi-path device in first multi-pathing software of a host device;
   to create a target multi-path device in second multi-pathing software different than the first multi-pathing software, in conjunction with non-disruptive switching of the host device from utilizing the first multi-pathing software to provide path selection functionality in the host device to utilizing the second multi-pathing software to provide the path selection functionality in the host device;
   to copy a set of paths of the source multi-path device to the target multi-path device;
   to add to the set of paths of the source multi-path device a new path to the target multi-path device; and
   to remove paths other than the new path from the source multi-path device to at least partially complete the non-disruptive switching, wherein after completion of the non-disruptive switching, the first multi-pathing software is not utilized to provide the path selection functionality in the host device;
   wherein the source multi-path device operates in accordance with a first storage access protocol for accessing one or more logical storage devices of a storage system and the target multi-path device operates in accordance with a second storage access protocol for accessing the same one or more logical storage devices of the storage system, the second storage access protocol being different than the first storage access protocol.

2. The apparatus of claim 1 wherein the at least one processing device comprises at least a portion of the host device that implements the source and target multi-path devices.

3. The apparatus of claim 2 wherein said at least one processing device comprises at least one multi-path input-output driver of the host device, with the multi-path input-output driver of the host device being configured to control delivery of input-output operations to the one or more logical storage devices of the storage system over selected ones of the paths in the copied set of paths.

4. The apparatus of claim 3 wherein the multi-path input-output driver of the host device comprises a device mapper multi-path input-output driver operating in a Linux native multi-pathing environment.

5. The apparatus of claim 1 wherein the first multi-pathing software comprises Linux native multi-pathing software of a Linux native multi-pathing environment and the second multi-pathing software comprises a different type of multi-pathing software of a different multi-pathing environment.

6. The apparatus of claim 1 wherein the source and target multi-path devices are part of an input-output stack for processing of input-output operations in the host device for delivery to the one or more logical storage devices of the storage system over selected ones of the paths in the copied set of paths.

7. The apparatus of claim 1 wherein one of the first and second storage access protocols comprises a Small Computer System Interface (SCSI) access protocol.

8. The apparatus of claim 1 wherein one of the first and second storage access protocols comprises a Non-Volatile Memory Express (NVMe) access protocol.

9. The apparatus of claim 1 wherein a given input-output operation generated by an application executing on the host device is directed by the application to the source multi-path device, and directed by the source multi-path device to the target multi-path device, the target multi-path device selecting a particular one of the paths in the copied set of paths for delivery of the given input-output operation to a logical storage device of the storage system.

10. The apparatus of claim 1 wherein the identifying, creating, copying, adding and removing provide the non-disruptive switching of path selection functionality of the host device, the non-disruptive switching comprising switching the path selection functionality from the source multi-path device of the first multi-pathing software to the target multi-path device of the second multi-pathing software.

11. The apparatus of claim 1 wherein copying a set of paths of the source multi-path device to the target multi-path device comprises copying at least portions of a storage access protocol personality of the source multi-path device to the target multi-path device.

12. The apparatus of claim 1 wherein adding to the set of paths of the source multi-path device a new path to the target multi-path device comprises:
   triggering a path add notification for the source multi-path device;
   suspending the source multi-path device;
   modifying a path data structure of the source multi-path device to add the new path to the target multi-path device; and
   resuming the source multi-path device.

13. The apparatus of claim 1 wherein removing paths other than the new path from the source multi-path device comprises:
   suspending the source multi-path device;
   modifying a path data structure of the source multi-path device to remove all paths other than the new path to the target multi-path device; and
   resuming the source multi-path device.

14. A computer program product comprising a non-transitory processor-readable storage medium having stored therein program code of one or more software programs, wherein the program code, when executed by at least one processing device comprising a processor coupled to a memory, causes the at least one processing device:

to identify a source multi-path device in first multi-pathing software of a host device;

to create a target multi-path device in second multi-pathing software different than the first multi-pathing software, in conjunction with non-disruptive switching of the host device from utilizing the first multi-pathing software to provide path selection functionality in the host device to utilizing the second multi-pathing software to provide the path selection functionality in the host device;

to copy a set of paths of the source multi-path device to the target multi-path device;

to add to the set of paths of the source multi-path device a new path to the target multi-path device; and to remove paths other than the new path from the source multi-path device to at least partially complete the non-disruptive switching, wherein after completion of the non-disruptive switching, the first multi-pathing software is not utilized to provide the path selection functionality in the host device;

wherein the source multi-path device operates in accordance with a first storage access protocol for accessing one or more logical storage devices of a storage system and the target multi-path device operates in accordance with a second storage access protocol for accessing the same one or more logical storage devices of the storage system, the second storage access protocol being different than the first storage access protocol.

15. The computer program product of claim 14 wherein a given input-output operation generated by an application executing on the host device is directed by the application to the source multi-path device, and directed by the source multi-path device to the target multi-path device, the target multi-path device selecting a particular one of the paths in the copied set of paths for delivery of the given input-output operation to a logical storage device of the storage system.

16. A method comprising:

identifying a source multi-path device in first multi-pathing software of a host device;

creating a target multi-path device in second multi-pathing software different than the first multi-pathing software, in conjunction with non-disruptive switching of the host device from utilizing the first multi-pathing software to provide path selection functionality in the host device to utilizing the second multi-pathing software to provide the path selection functionality in the host device;

copying a set of paths of the source multi-path device to the target multi-path device;

adding to the set of paths of the source multi-path device a new path to the target multi-path device; and removing paths other than the new path from the source multi-path device to at least partially complete the non-disruptive switching, wherein after completion of the non-disruptive switching, the first multi-pathing software is not utilized to provide the path selection functionality in the host device;

wherein the source multi-path device operates in accordance with a first storage access protocol for accessing one or more logical storage devices of a storage system and the target multi-path device operates in accordance with a second storage access protocol for accessing the same one or more logical storage devices of the storage system, the second storage access protocol being different than the first storage access protocol; and wherein the method is performed by at least one processing device comprising a processor coupled to a memory.

17. The method of claim 16 wherein a given input-output operation generated by an application executing on the host device is directed by the application to the source multi-path device, and directed by the source multi-path device to the target multi-path device, the target multi-path device selecting a particular one of the paths in the copied set of paths for delivery of the given input-output operation to a logical storage device of the storage system.

18. The method of claim 16 wherein the first multi-pathing software comprises Linux native multi-pathing software of a Linux native multi-pathing environment and the second multi-pathing software comprises a different type of multi-pathing software of a different multi-pathing environment.

19. The method of claim 16 wherein one of the first and second storage access protocols comprises a Small Computer System Interface (SCSI) access protocol.

20. The method of claim 16 wherein one of the first and second storage access protocols comprises a Non-Volatile Memory Express (NVMe) access protocol.

* * * * *